United States Patent
Galloway et al.

(10) Patent No.: US 8,789,630 B2
(45) Date of Patent: Jul. 29, 2014

(54) VARIABLE STIFFNESS LEG STRUCTURE FOR MULTIPEDE RUNNING ROBOTS

(75) Inventors: Kevin C. Galloway, Somerville, MA (US); Jonathan E. Clark, Tallahassee, FL (US); Daniel E. Koditschek, Philadelphia, PA (US)

(73) Assignee: The Trustees Of The University of Pennsylvania, Philadelphia, PA (US)

( * ) Notice: Subject to any disclaimer, the term of this patent is extended or adjusted under 35 U.S.C. 154(b) by 449 days.

(21) Appl. No.: 13/196,001

(22) Filed: Aug. 2, 2011

(65) Prior Publication Data
US 2012/0031218 A1    Feb. 9, 2012

Related U.S. Application Data

(60) Provisional application No. 61/370,260, filed on Aug. 3, 2010.

(51) Int. Cl.
*B62D 57/00* (2006.01)
(52) U.S. Cl.
USPC ............. 180/8.1; 74/490.01; 74/490.04
(58) Field of Classification Search
USPC ..................... 180/8.1; 74/490.01, 490.04
See application file for complete search history.

(56) References Cited

U.S. PATENT DOCUMENTS

| | | | |
|---|---|---|---|
| 6,481,513 B2 | 11/2002 | Buehler | |
| 7,543,663 B2 * | 6/2009 | Setrakian et al. | 180/8.1 |
| 7,588,105 B2 * | 9/2009 | Hillis et al. | 180/7.1 |
| 7,753,145 B2 * | 7/2010 | Hillis et al. | 180/8.1 |
| 7,982,423 B2 * | 7/2011 | Skaff | 318/568.12 |
| 8,104,553 B2 * | 1/2012 | Setrakian et al. | 180/8.1 |

* cited by examiner

*Primary Examiner* — Kevin Hurley
*Assistant Examiner* — Michael Stabley
(74) *Attorney, Agent, or Firm* — RatnerPrestia

(57) ABSTRACT

According to one aspect, this invention provides an apparatus for varying the stiffness of a leg of a robotic system. The apparatus includes a compliant spine assembly including a compliant spine mounted for movement adjacent the leg and a rack coupled to the compliant spine. It also includes a motor assembly positioned to move the compliant spine of the compliant spine assembly with respect to the leg, the motor assembly including a gear engaging the rack of the compliant spine assembly and a motor coupled to drive the gear. The compliant spine of the compliant spine assembly is configured to vary the stiffness of the leg of the robotic system as it is moved by the motor assembly with respect to the leg.

8 Claims, 10 Drawing Sheets

| Material | ρ (g/cc) | E (Gpa) | S (Mpa) | (S/E) x10³ | u x 10³ (J/kg) | $ (USD) per leg |
|---|---|---|---|---|---|---|
| Aluminum 7075-T6 | 2.81 | 71.7 | 500 | 7.0 | 1.24 | 1 |
| Fiberglass (S2-6781) | 2.25 | 22 | 400+ | 18.2 | 3.23 | 3 |
| Nitinol | 6.50 | 1 | 1000 | 1333 | 6.8* | 30+ |
| Steel (4140 Q&T@400) | 7.75 | 207 | 238 | 1.1 | 0.04 | 2.5 |
| TP-4004 (Epoxy) | 1.17 | 0.80 | 34 | 42.5 | 1.24 | 6 |

*Duerig et al., "Engineering Aspects of Shape Memory Alloys," 1990.

FIG. 4

VARIABLE STIFFNESS LEG STRUCTURE FOR MULTIPEDE RUNNING ROBOTS

CROSS REFERENCE TO RELATED APPLICATIONS

This application claims priority to U.S. Patent Application No. 61/370,260, entitled "A VARIABLE STIFFNESS LEG STRUCTURE FOR MULTIPEDE RUNNING ROBOTS," filed on Aug. 3, 2010, the contents of which are incorporated herein by reference in their entirety.

STATEMENT REGARDING FEDERALLY SPONSORED RESEARCH

The U.S. Government has a paid-up license in this invention and the right in limited circumstances to require the patent owner to license others on reasonable terms as provided for by the terms of Grant No. NSF-FIBR-0425878 awarded by the National Science Foundation.

FIELD OF THE INVENTION

The present invention relates to a leg for a robot such as a hexapedal running robot.

BACKGROUND OF THE INVENTION

Passively compliant legs have been instrumental in the development of dynamically running legged robots. Having properly tuned leg springs is beneficial for stable, robust and energetically efficient running at high speeds. Recent simulation studies indicate that having variable stiffness legs, as animals do, can significantly improve the speed and stability of these robots in changing environmental conditions.

However, to date, the mechanical complexities of designing usefully robust tunable passive compliance into legs has precluded their implementation on practical running robots. Therefore, there remains a need for improvements in terms of performance in a small, lightweight, and rugged package.

SUMMARY OF THE INVENTION

According to one aspect, this invention provides an apparatus for varying the stiffness of a leg of a robotic system. The apparatus includes a compliant spine or compliant slider assembly including a compliant spine mounted for movement adjacent the leg and a rack coupled to the compliant spine. It also includes a motor assembly positioned to move the compliant spine of the compliant spine assembly with respect to the leg, the motor assembly including a gear engaging the rack of the compliant spine assembly and a motor coupled to drive the gear. The compliant spine of the compliant spine assembly is configured to vary the stiffness of the leg of the robotic system as it is moved by the motor assembly with respect to the leg.

The compliant spine optionally includes a guide positioned to guide the compliant spine of the compliant spine assembly as it moves with respect to the leg of the robotic system, at least one spacer positioned to space the compliant spine of the compliant spine assembly from the leg of the robotic system, and/or a receiver configured to receive instructions from a user, the receiver being electronically coupled to the motor of the motor assembly to actuate the motor. The motor assembly optionally includes a worm and a spur gear.

According to another aspect, this invention provides a method for varying the stiffness of a leg of a robotic system. The method includes communicating remotely with a motor assembly positioned to move a compliant spine of a compliant spine assembly with respect to the leg of the robotic system; and actuating a motor of the motor assembly to drive a gear of the motor assembly to move the compliant spine adjacent the leg of the robotic system by means of a rack coupled to the compliant spine, thereby varying the stiffness of the leg of the robotic system as the compliant spine is moved with respect to the leg of the robotic system.

According to yet another aspect, the invention provides a robotic system configured for locomotion. The robotic system includes a body; at least one leg assembly coupled for movement with respect to the body, the leg assembly having a leg, a compliant spine assembly including a compliant spine mounted for movement adjacent the leg and a rack coupled to the compliant spine; and a motor assembly positioned to move the compliant spine of the compliant spine assembly with respect to the leg, the motor assembly including a gear engaging the rack of the compliant spine assembly and a motor coupled to drive the gear, wherein the compliant spine of the compliant spine assembly is configured to vary the stiffness of the leg of the leg assembly as it is moved by the motor assembly with respect to the leg.

BRIEF DESCRIPTION OF THE DRAWINGS

The foregoing summary, as well as the following detailed description of exemplary embodiments of the invention, will be better understood when read in conjunction with the appended drawings, which are incorporated herein and constitute part of this specification. For the purposes of illustrating the invention, there are shown in the drawings exemplary embodiments of the present invention. It should be understood, however, that the invention is not limited to the precise arrangements and instrumentalities shown. In the drawings, the same reference numerals are employed for designating the same elements throughout the several figures. In the drawings:

FIG. 4 illustrates a comparison of exemplary material properties;

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Animals, unlike most current robotic systems, are able to adjust the physical properties of their limbs as well as their control parameters to help them adapt to changing conditions in their environment. One of the challenges in the field of robotic legged locomotion is to develop active, programmable mechanisms to endow robotic structures with the kind of adaptability and robustness found in biological systems.

One approach for improving robotic leg locomotion involves incorporating tunable mechanical leg stiffness. The hypothesis behind this approach is that tuned resonant running leads to energy efficient and stable locomotion. Matching the leg stiffness to the leg swing frequency can minimize the amount of motor work that must be inserted during each stance phase. Such tunable leg stiffness can be used to improve robot speed and stability.

Figure 1:
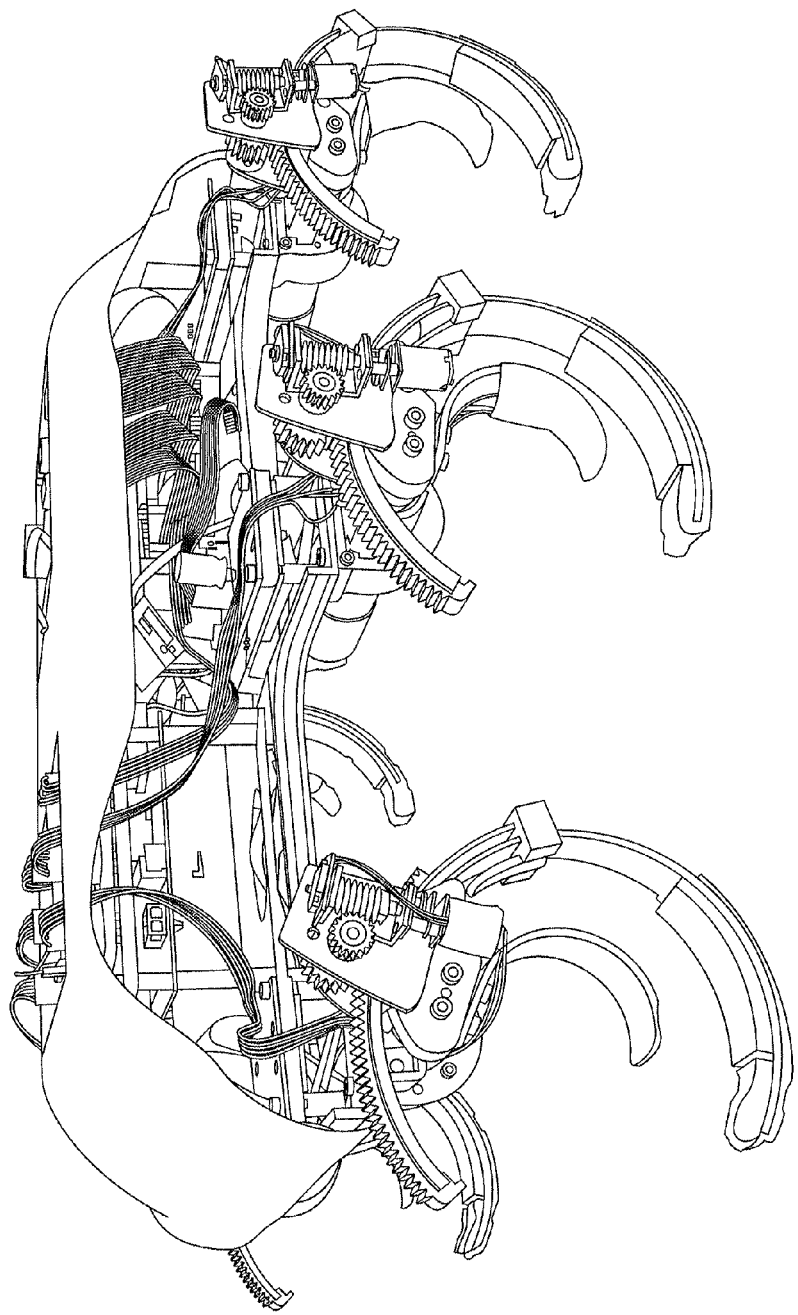
FIG. 1 illustrates a picture of an embodiment of a hexapedal dynamic legged locomotion platform.

Tuning of leg stiffness can be beneficial in a hexapedal robot, such as the one shown in FIG. 1, which serves as an exemplary platform for the leg design according to aspects of the present invention. Additional details regarding an example of such a hexapedal robot are described in U.S. Pat. No. 6,481,513 (Single Actuator Per Leg Robotic Hexopod), the contents of which are incorporated herein by reference in their entirety.

Legs that can individually adjust their stiffness can be especially beneficial for multi-legged runners. Functional specialization in the front, middle, and rear legs of hexapedal runners can contribute to their stability, and running quadrupeds may respond faster to perturbations in ground height if leg stiffness is increased. Additionally, run-time alteration of the passive compliance of individual pairs of legs may allow a robot to more successfully adapt to changes in the running environment.

There are several methods for mechanically adjusting leg stiffness. In one design for a bipedal system, the Biped with Mechanically Adjusted Series Compliance (BiMASC) uses an antagonistic set-up of two non-linear fiberglass springs to store and return energy. A complex system of cables and two motors adjusts the set point and pretension on the fiberglass springs. This device demonstrates variable stiffness, but there is some inefficiency at storing and returning energy during hopping that may be attributed to the fact that in an antagonistic spring arrangement only one spring actually compresses to store energy while the other relaxes to transfer energy into the compressing spring. Furthermore, the internal forces generated by antagonistic spring arrangements may increase the frictional losses of the system.

Tunable stiffness can also be achieved using antagonistic pneumatic actuators such as McKibben actuators and pleated pneumatic artificial muscle. Although stiffness control has been achieved through pneumatic actuation, the power requirements for pneumatics can make it difficult to implement on any autonomous dynamic legged locomotion system.

Another approach, perhaps better suited for implementation on small robots, is the method of structure-controlled stiffness where a mechanical change in the device alters the stiffness of a spring element. For example, a passive spring element may be constructed from several layers of flexible sheets. The mechanical impedance of the passive element is adjusted by controlling the connectivity of the layers through an external stimulus such as a vacuum. In another example, the mechanical impedance of robot finger joints is adjusted by changing the effective length of a leaf spring. Also, a tunable helical spring concept in which stiffness is adjusted by controlling the number of active coils can be utilized.

Alternatively, leg stiffness can be adjusted by sliding an element along the length of "C-shaped" compliant legs. The portion of the leg covered by the element is assumed to be rigid, while the remaining exposed portion is considered to be compliant. The overall stiffness can be varied by as much as 90%.

Maintaining consistent tip trajectory for the continuous range of stiffness settings can be beneficial in a tunable leg. Specifically, the deflection path of the leg spring may respond differently to applied loads depending on the stiffness setting. Such configurations can make it difficult to determine whether a tunable leg performed better or worse due to the change in stiffness or to the altered deformation behavior.

Increasing the stiffness of the leg spring with a rigid slider may also shift the center of mass. Making a slider rigid can require a more massive structure to resist deformation during the stance phase. Adjusting the rigid slider position to increase leg stiffness can cause the leg moment of inertia to shift away from the axis of rotation. This can significantly increase the loads on the motor due to leg acceleration changes during each stride.

Passive compliant C-shaped legs can enable the robot to navigate rough terrain by allowing compliant ground contact anywhere along the length of the leg. A leg design with a rigid slider can, however, effectively limit the leg length that is capable of absorbing impacts. Legs are generally stiffer at higher speeds where the potential for damage from collisions is greatest.

According to embodiments of this invention, a variable stiffness leg design can improve upon the rigid slider configuration, improve the efficiency of the leg, and incorporate an actuation system to enable autonomous stiffness adjustment. It can provide a small, light, and robust limb that can be employed on a robot to empirically test the proposed advantages of variable compliance limbs in running. In particular, the effect of changing stiffness can reduce the impact of other factors, such as leg length, damping, or deflection path.

According to one embodiment, this invention provides a 'C-Shaped' leg with a novel compliant spine. The design of the mechanism to slide the spine is described below, as well as the material selection and property choices which led to the selection of the particular composite structure chosen-S2-6781 pre-preg fiberglass (produced by Applied Vehicle Technologies, Inc., located in Indianapolis, Ind.).

Compliant Spine Mechanism

Figure 2:
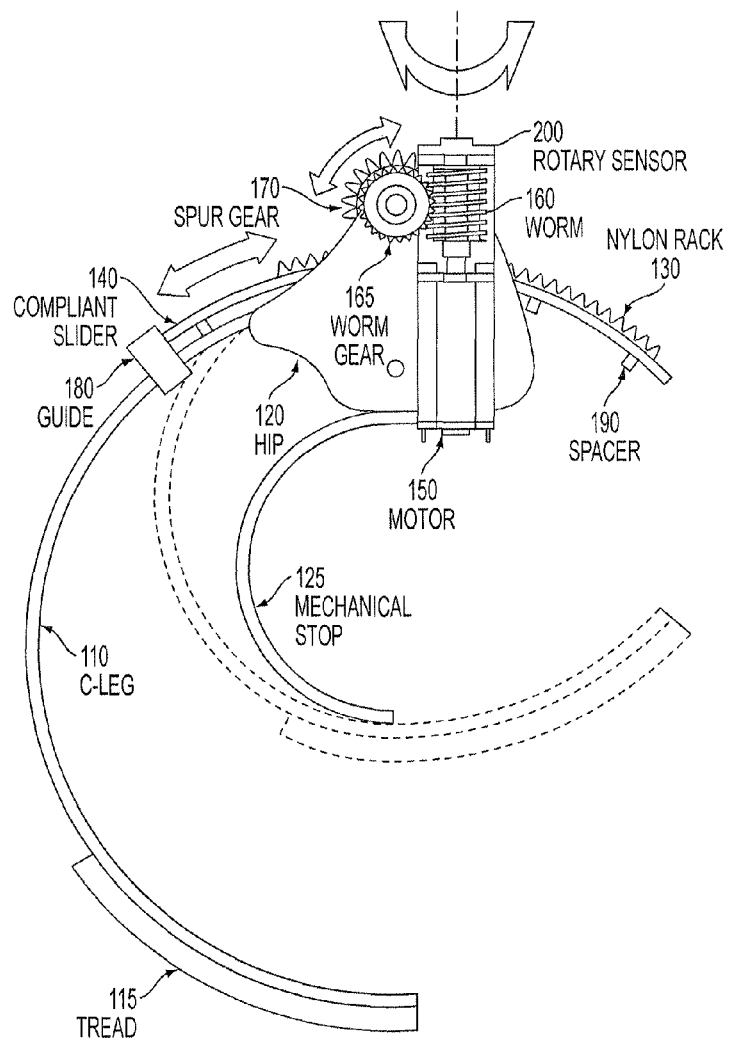
FIG. 2 illustrates a side view of an embodiment of a tunable stiffness composite leg design, which illustrates the rotation directions of gears.
Figure 3:
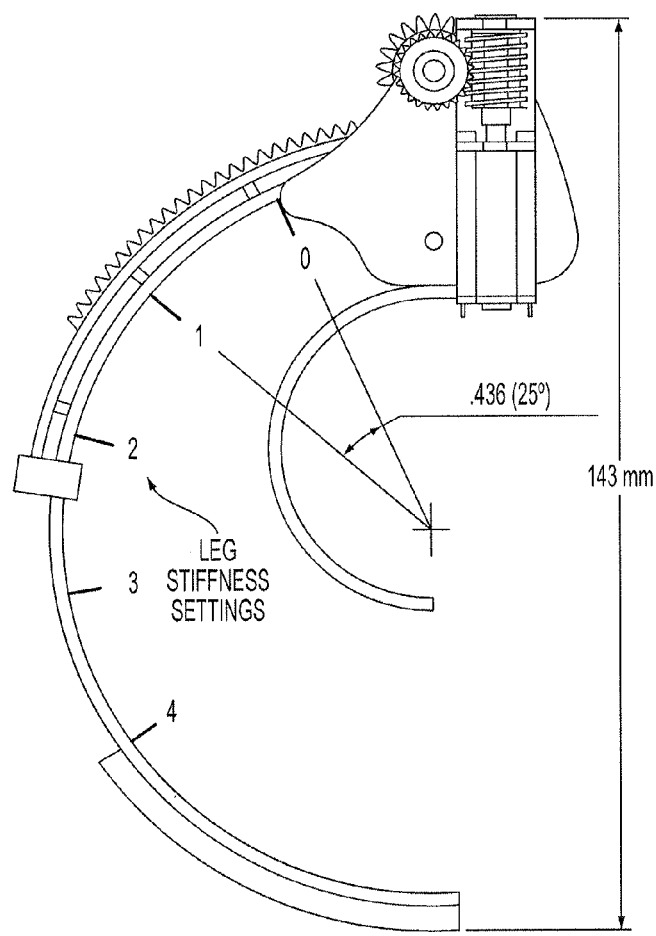
FIG. 3 illustrates a side view of an embodiment of a tunable stiffness composite leg design, which illustrates the spine adjusted to a higher stiffness setting.

It has been discovered that replacing the rigid slider with a compliant spine or compliant slider offers a significant variability in effective stiffness without significantly altering the shape of the spring. As shown in FIG. 2, the leg 110 is anchored to a hip structure 120 which also supports the drive mechanism. Leg 110 may be equipped with tread 115. Hip structure 120 may be made of aluminum or similar material as dictated by the application. A thin, flexible rack 130 (e.g., Nylon) is anchored to the back of the compliant spine or compliant slider 140, and controls the spine position without significantly altering the spine stiffness. The position of the spine can be adjusted by activating a small, geared DC motor 150 mounted to the hip 120, which simultaneously drives a worm 160 that is engaged with a worm gear 165 which is in turn coupled to a spur gear 170.

A small guide 180, optionally aluminum, plastic, or composite, is attached at one end of the spine 140 and wraps around the C-leg 110. The guide 180 holds the spine 140 against the C-leg 110 and acts as a mechanical stop when the spine is actuated to softest stiffness setting. The spacing between the C-leg 110 and the compliant spine 140 is approximately 1.5 mm though other gaps are also contemplated. It is beneficial to maintain spacing so that the two compliant elements deform together under load. To enforce this condition, small spacers 190 may be attached to the inside surface of the compliant spine 140.

During operation, the motor 150 can rotate clockwise or counterclockwise to move the slider through the continuous spectrum of leg stiffnesses. When the slider reaches a target stiffness setting, the motor 150 shuts off, and the worm 160 provides sufficient resistance to rotation in either direction, thus acting as a natural self-locking mechanism. Hence no power is required to maintain a desired leg stiffness during locomotion. This also results in a robust and efficient spring as there are no moving parts for a given stiffness setting. In one exemplary embodiment, the tunable C-leg 110 has a 114 mm inner diameter and weighs less than 85 grams.

An additional feature of the design is a mechanical stop 125. Mechanical stop 125 may be attached directly to hip structure 120. Mechanical stop 125 prevents the leg from deflecting into regions where failure may occur and to prevent the robot from bottoming out. The mechanical stop 125 may be compliant or rigid, but serves the purpose of significantly restricting the deflection of the leg under load past a certain point.

Another feature of the design is position sensor 200 which is used to detect the position of the compliant slider 140 of the compliant slider assembly as it moves with respect to the leg 110 of the robotic system. This feature enables the robot to detect the current leg stiffness setting and to detect the rate at which the compliant slider 140 moves.

It is understood to one skilled in the art, however, that the present invention is not limited to just these dimensions and any dimensions may be used as needed for the appropriate application the present invention is being used for.

Material Selection

As with any passive compliant spring mechanism, the material property of the spring element and shape dictate its ability to store and return energy. Important material properties to consider for any elastic element include its density, Young's modulus, yield strength, fatigue life, energy storage density, and manufacturability. Some of the materials that may be used include plastic, nitinol, aluminum and glass fiber composites, however, it is understood to one skilled in the art that the present invention is not limited to just these materials. These materials and some of their properties are listed in FIG. 4 where p is the density, E is the Young's Modulus, S is the ultimate yield strength, S/E is the yield strength to Young's modulus ratio, and U is the specific strain energy of the material which is expressed as:

$$U = \frac{S^2}{\rho E}$$

It can be observed that the materials with the best specific strain energy capacity are those with a large yield strength and a low density and Young's modulus.

Shape deposition manufacturing (SDM) can be used to manufacture legs from an epoxy (TP-4004 Innovative Polymers, Inc., Saint Johns, Mich.). Epoxies come in a wide range of Young's modulus and yield strength values and through SDM, one can manufacture consistent parts with arbitrary geometries using wax molds.

Nitinol offers attractive properties including the ability to recover from bending strains as large as 10% without plastically deforming (spring steel can manage about 0.2% strain before plastic deformation), and a low Young's modulus. For example, in order to achieve a desired curvature, nitinol must be clamped to a custom mold and baked at temperatures of 530 degrees C.

Composite laminate, specifically S2-6781 pre-preg fiberglass, is optimally selected as the material of choice for several reasons including its relatively low density and Young's modulus, high yield strength, comparatively high specific strain energy capacity and low material cost. In addition to these properties, composite laminates expand the available design space by offering the ability to change the Young's modulus value. The isotropic nature of the other materials considered (i.e. metal and plastic) often leads to situations where a desired spring element geometry such as the moment of inertia, does not have the yield strength to withstand the demands of the intended environment which include stresses caused by changing payloads, speeds, irregular landings and collisions. Many composites, including the fiberglass composite, are anisotropic and thus have properties that change depending on the orientation along which the property is measured. By laying the plies in certain orientations during the manufacturing process, one can change the Young's modulus of a composite material by a factor of two or more. Thus, compared to isotropic materials, the stiffness of a spring element constructed from an anisotropic material is less dependent on the spring geometry.

Figure 5:
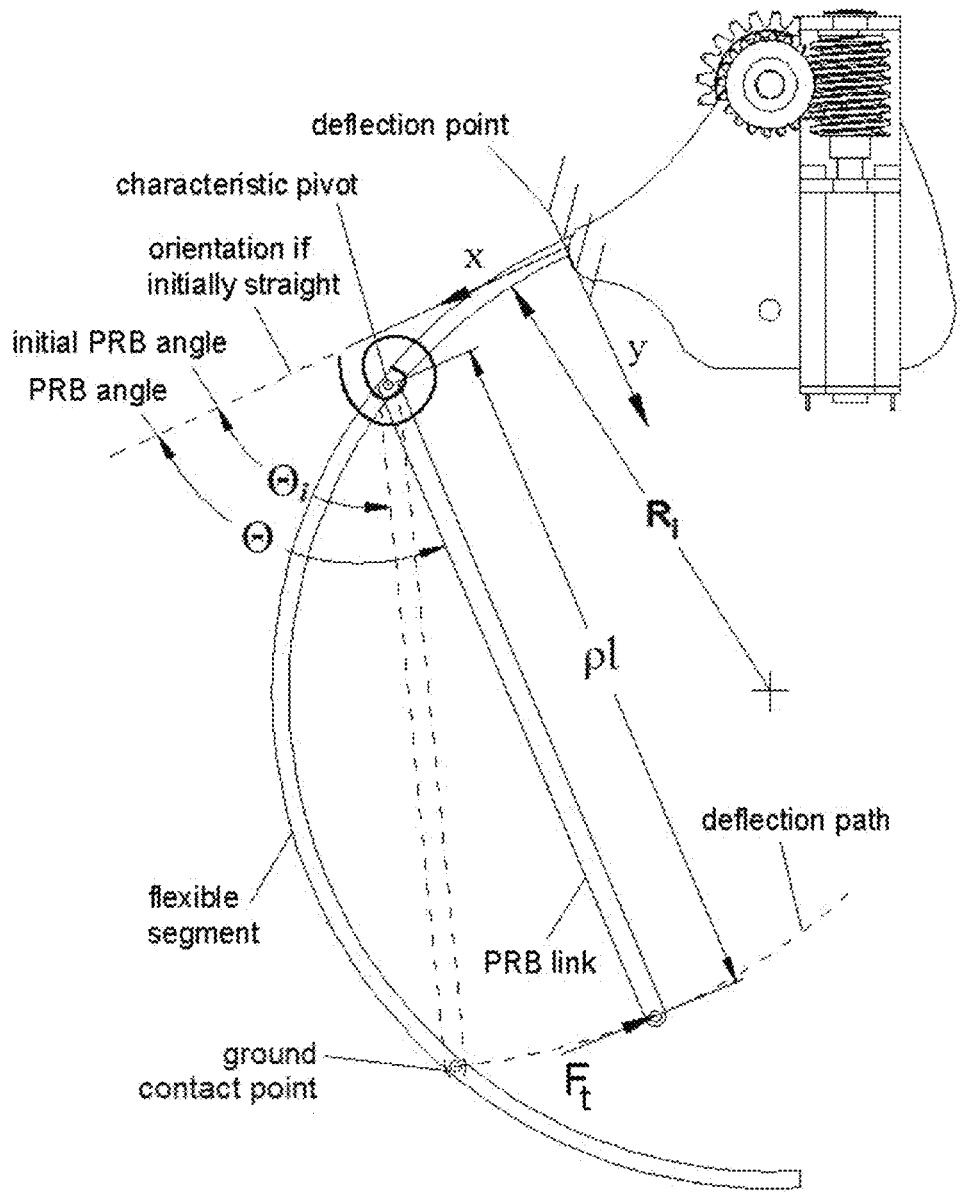
FIG. 5 illustrates an embodiment of a pseudo-rigid-body model applied to a c-shaped leg.

To estimate the stiffness range of the compliant C-leg with a compliant spine, the pseudo-rigid-body (PRB) model can be employed. The PRB is an appropriate choice of a model as it accurately captures the large non-linear deflections of the C-leg under an applied load with a very small investment of time. In the PRB model, flexible members are represented as rigid links connected via hinge or pin joints with torsional springs. In this model, the initial curvature and leg length are related through the non-dimensionalized parameter:

$$k_o = \frac{l}{R_i}$$

where l is the leg arc length measured along the centroidal axis of the leg from the point of deflection to the point of the applied loading, and $R_i$ is the initial radius of the curved beam. FIG. 5 details the components of the PRB model where the characteristic radius factor, p, is used to determine the location of the characteristic pivot and the length of the pseudo-rigid body link. The PRB angle, $\Theta$, specifies the angle of the PRB link while, $\Theta_i$, defines the initial angle of the PRB link. The magnitude of the torsional spring constant, $K_t$, is given by:

$$K_t = \rho K_\Theta \frac{EI}{l}$$

where $K_\Theta$ is the stiffness coefficient, E is the Young's modulus, and I is the moment of inertia in the sagittal plane. For a given $K_\Theta$ value, r and $K_\Theta$ can be averaged for a range of loading conditions, but more conveniently, approximations can be captured in a simple look-up table. Therefore, E, I, $R_i$, and l are all that is needed to approximate $K_t$.

When the tunable leg is at the stiffest setting, the effective moment of inertia is best expressed as $$I_{effective} = I_{leg} + I_{spine}$$

where $I_{leg}$ is equal to $b_{leg}h^3_{leg}/12$ and $I_{spine}$ is expressed as $$I_{spine} = \frac{E_{spine}b_{spine}h^3_{spine}}{12E_{leg}}$$

The ratio of $E_{spine}$ to $E_{leg}$ is a common expression used to account for situations in which members subject to bending are made of more than one material. With composite materials it is easy to fabricate the leg and spine for two very different Young's moduli.

Figure 6:
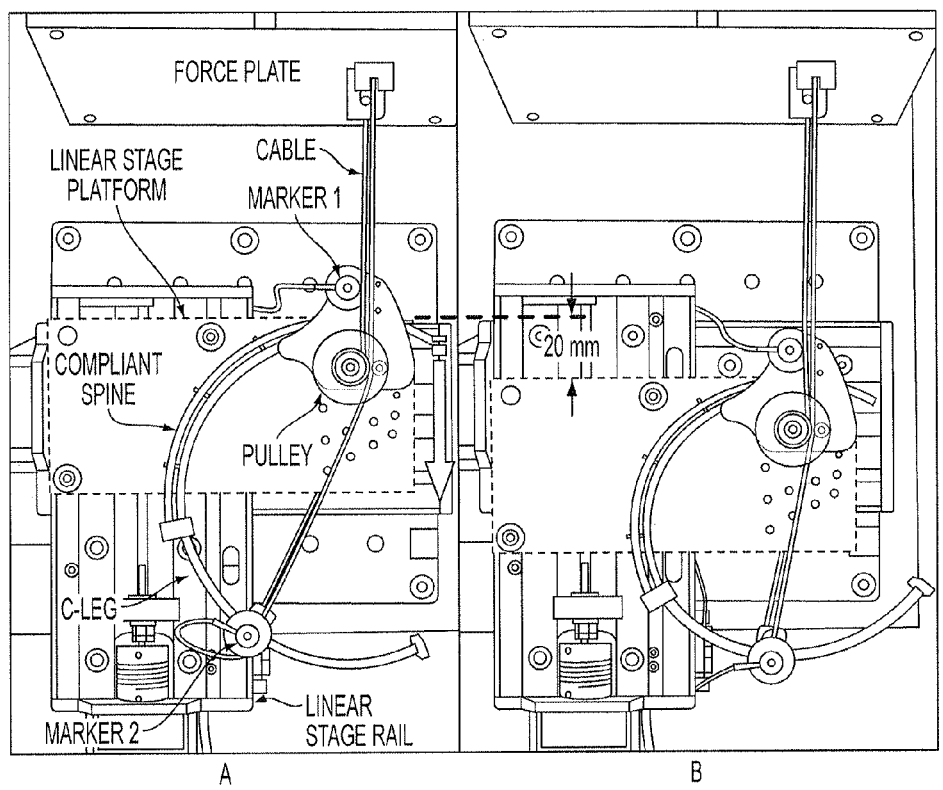
FIG. 6 illustrates an embodiment of an experimental set-up illustrating a linear stage in the home position with the leg undeflected (side "A") and a platform that has been moved a distance, d, with the leg deflected (side "B")

To observe the leg deflection behavior and to validate the PRB model, an experimental apparatus can be constructed to measure an applied load and to record the resulting deflection path. A Micos linear stage and an AMTI HE6x6 force plate can be rigidly connected to an aluminum base plate. The linear stage has a resolution of one micrometer and is capable of traveling 80 mm at rates as high as 14 mm/s. The AMTI HE6x6 is a six axis force plate capable of measuring loads as large as 16 pounds at 200 hz with 12-bit resolution. The C-leg's aluminum hip is anchored to the linear stage platform and the C-leg is cantilevered out from the platform. An aluminum clamp is affixed to the leg at the position indicated by Marker 2 in shown in side A of FIG. 6. One end of a flexible steel cable is anchored to the force plate while the other is connected to the leg clamp. A pulley is anchored to the hip to provide a rolling contact point and to make the cable normal to the force plate's surface. The linear stage is commanded to translate, as shown in side B of FIG. 6, the hip a distance of 20 mm at 10 mm/s in the y-direction (given by large downward pointing white arrow on the right side of FIG. 6). The force plate collects the reaction forces at the loading point (Marker 2) at a sampling rate of 200 Hz. An Optotrak 3020 motion capture system is used to capture the position of Markers 1 and 2 also at a sampling rate of 200 Hz. This is repeated for each of the leg stiffness settings 0-4 by shifting the compliant spine (see FIG. 4) along the length of the C-leg. The 6-ply fiberglass C-leg and spine is constructed with an alternating 50/50 blend ratio where 50% of the plies where angled at 45 degrees while the other half are angled at 0 degrees. The leg inner diameter is 114 mm with a thickness of 2.25 mm and a width of 18 mm. The Young's modulus value is estimated to be 9.65 GPa.

Stiffness

Figure 7:
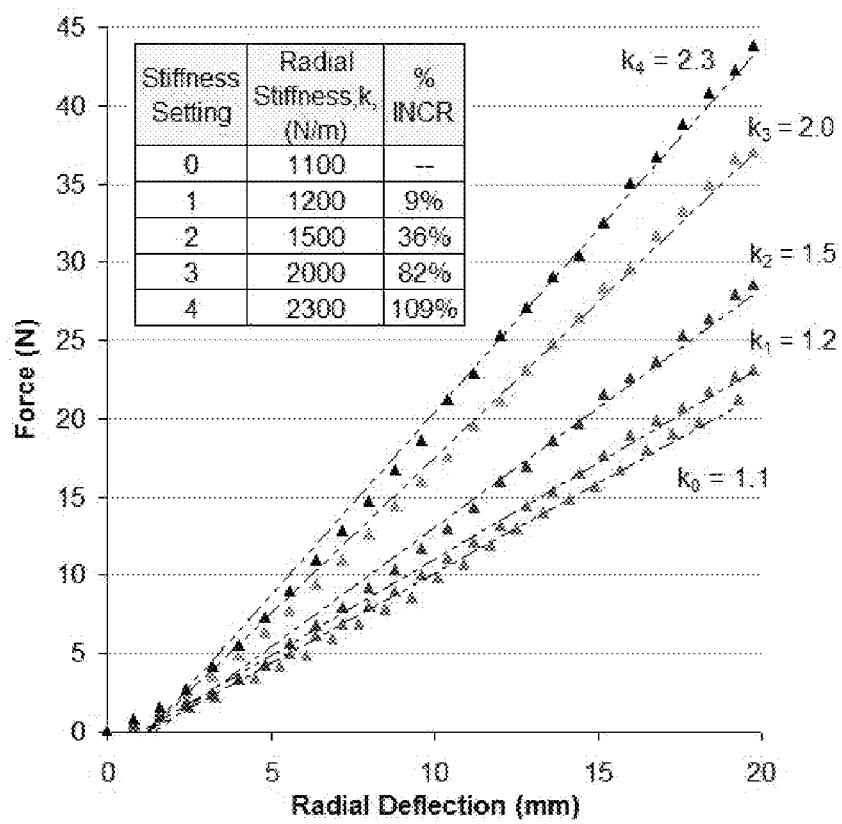
FIG. 7 illustrates a spring force response at four different leg stiffness settings each with a curve fit (dotted line) applied to loading phase.

In FIG. 7 the experimental results of the load measured against the deflection in the radial direction demonstrate that the stiffness increases monotonically. The stiffness, which is indicated as a slope value, k, next to each curve, doubles between the two stiffness extremes. The stiffness increase from leg stiffness setting (LSS)0 and LSS1 is approximately 9% for this configuration.

Deflection Orientation

Figure 8:
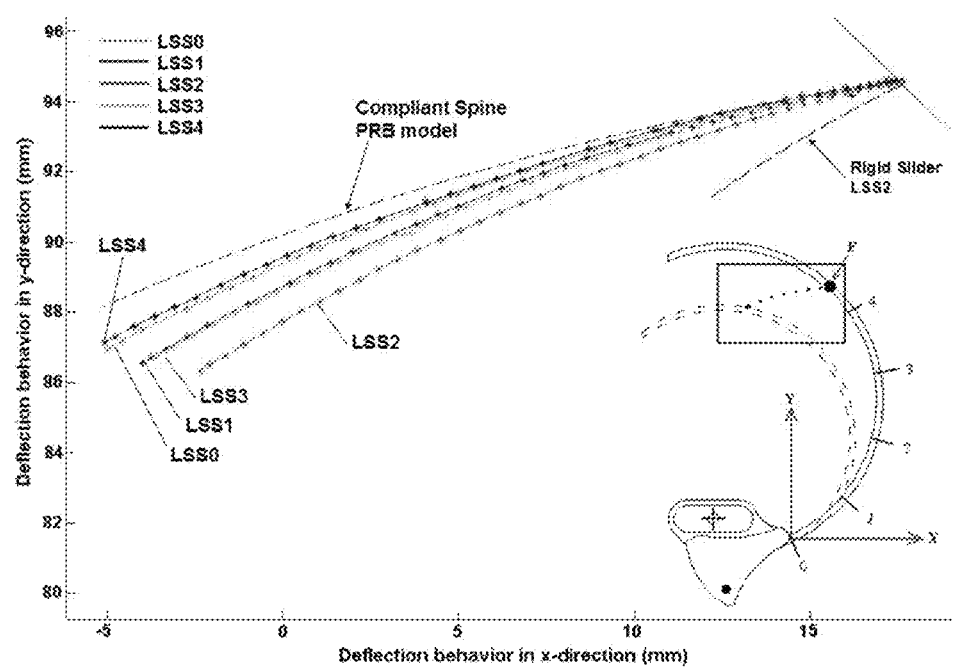
FIG. 8 illustrates a deflection path of an embodiment of a leg for various stiffness settings.
Figure 9:
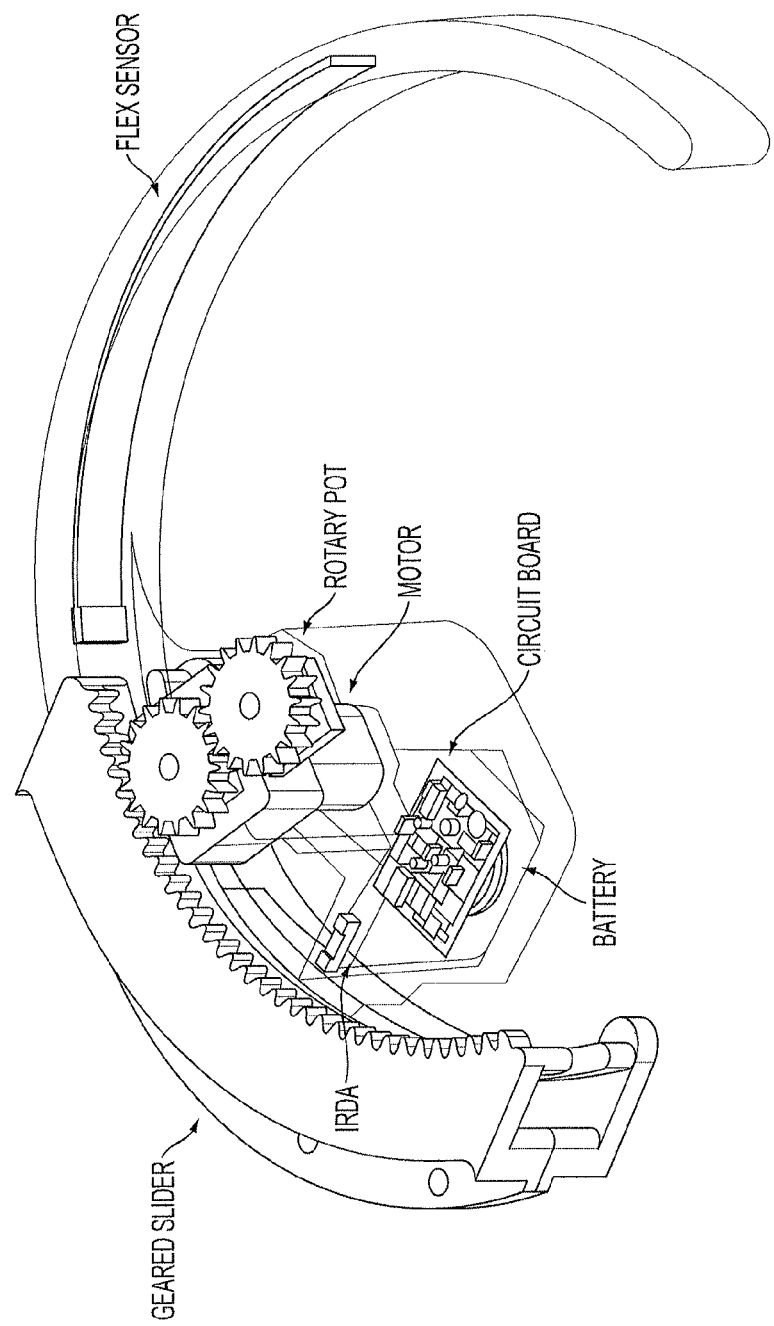
FIG. 9 illustrates an alternative embodiment of a leg assembly according to aspects of this invention.

In FIG. 8 the actual xy-deflection of the leg under load is presented. The bottom right image in FIG. 8 provides a bearing for the location and orientation of the xy-axis while the rectangle reflects the results window. For the range of the stiffness settings the deflection paths showed low variability. In particular, the deflection path of the two extreme stiffnesses (i.e. LSS0 and LSS4) are almost identical and vary by no more than 0.5 mm from each other. At maximum deflection, these results are also within 1 mm of the deflection path predicted by the compliant spine PRB model, which for a total deflection of 20 mm in the y-direction, represents about a 5% estimation error. The deflection path at LSS2 showed the most deviation.

At maximum deflection, the y-component deviation is approximately 2 mm which represents roughly a 10% difference from the compliant spine PRB curve. For comparison purposes, the same tangential force that produced the deflection path for LSS2 is applied to a rigid slider PRB model also at LSS2. The rigid slider tuning method clearly produces very different spring behavior (see curve labeled 'Rigid Slider LSS2'). The stiffness is much larger given by the short deflection path, and the characteristic radius is much shorter creating a steep deflection path. It should be noted that achieving consistent deflection behavior for all stiffnesses while achieving a large deflection range are two competing objectives. If the compliant spine is too soft then the deflection path will be consistent; however, the stiffness range will be very small. Similarly, if the compliant spine is too stiff, the deflection path and stiffness range will begin to reflect the rigid slider model. Therefore, while deviation in deflection behavior is expected through proper material selection and geometries this can be minimized while still achieving a considerable stiffness range.

Tunable legs have the potential to allow autonomous robots to locomote with improved efficiency, stability, and animal-like agility. With a proper selection of materials and geometries, the tunable leg can achieve a 100% or more change in stiffness without a significant change in deflection behavior. Several materials have been considered; however, it is understood by one skilled in the art that the present invention is not limited to just those materials discussed herein.

A slip ring based motor assembly facilitates communication and powering of the legs. While a wireless solution is technically feasible, a wireless solution may require the need to remove and charge batteries on each leg, dropped signals, noise from the environment affecting the Infrared Data Association's (IRDa's) and so forth. A slip ring on the other hand, offers a direct electrical connection between the leg and the robot. In this way, the legs and sensors are powered by the batteries on the robot, and sensor signals can be passed in the same manner. A slip ring offers a more robust configuration to enable accurate collection of data, and more importantly, will minimize robot downtime.

Figure 10:
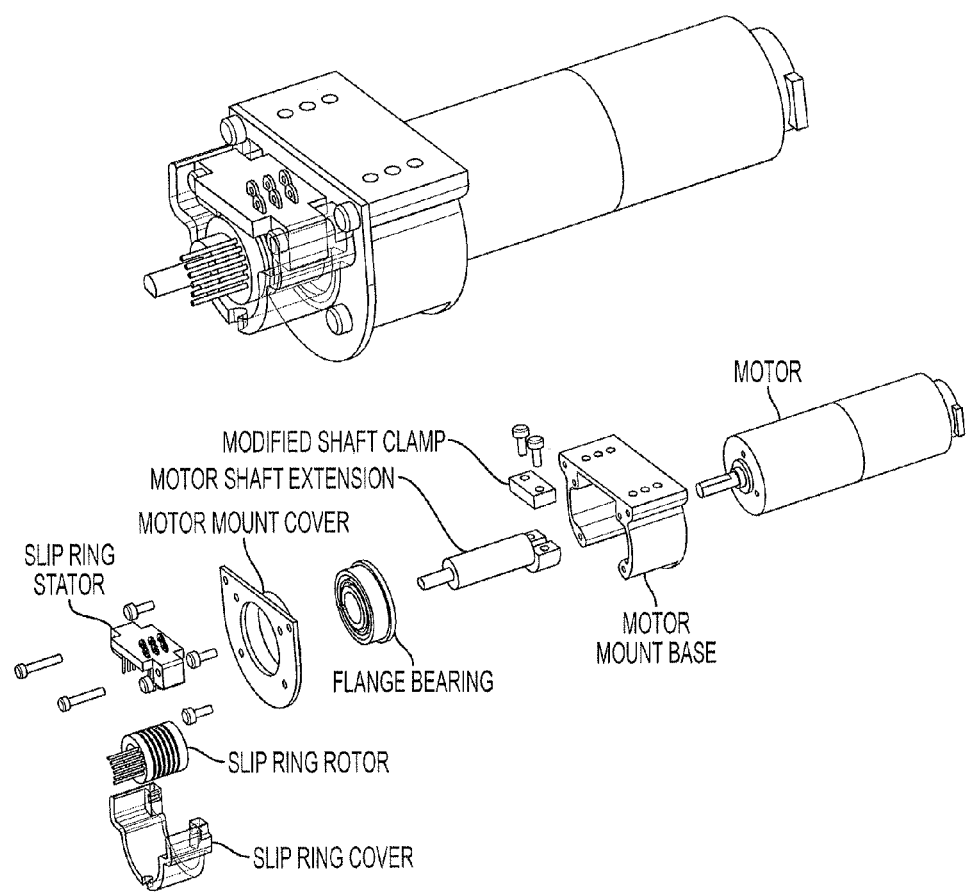
FIG. 10 illustrates an assembled and exploded view of an embodiment of a motor assembly including a slip ring to allow the legs to continuously rotate and source power from the robot power supply.

In the slip ring motor assembly, a six contact slip ring was sourced from Keyo Electric Company in China and can operate at 300 RPM continuously handling as much as 2 amps per circuit. FIG. 10 details the entire motor mount assembly, which implements a slip ring for a RHex-like locomotion system. An aluminum shaft extension was created to accommodate the added spacing between the robot and the leg caused by the slip ring's rotor and stator. Furthermore to reduce the load on the motor shaft, an angle bearing was also incorporated.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. An apparatus for varying the stiffness of a leg of a robotic system, the apparatus comprising:
   a compliant slider assembly including a compliant slider mounted for movement adjacent the leg and a rack coupled to the compliant slider; and
   a motor assembly positioned to move the compliant slider of the compliant slider assembly with respect to the leg, the motor assembly including a gear engaging the rack of the compliant slider assembly and a motor coupled to drive the gear;

wherein the compliant slider of the compliant slider assembly is configured to vary the stiffness of the leg of the robotic system as it is moved by the motor assembly with respect to the leg.

2. The apparatus of claim 1 wherein the compliant slider assembly further comprises a guide positioned to guide the compliant slider of the compliant slider assembly as it moves with respect to the leg of the robotic system.

3. The apparatus of claim 1 wherein the compliant slider assembly further comprises a position sensor to detect the position of the compliant slider of the compliant slider assembly as it moves with respect to the leg of the robotic system.

4. The apparatus of claim 1 further comprising a mechanical stop mounted to prevent the leg from deflecting into regions where failure may occur.

5. The apparatus of claim 1 wherein the compliant slider assembly further comprises at least one spacer positioned to space the compliant slider of the compliant slider assembly from the leg of the robotic system.

6. The apparatus of claim 1 wherein the motor assembly further comprises a worm and a spur gear.

7. The apparatus of claim 1 further comprising a receiver configured to receive instructions from a user, the receiver being electronically coupled to the motor of the motor assembly to actuate the motor.

8. A robotic system configured for locomotion, the robotic system comprising:

a body;

at least one leg assembly coupled for movement with respect to the body, the leg assembly having a leg, a compliant slider assembly including a compliant slider mounted for movement adjacent the leg and a rack coupled to the compliant slider, and a motor assembly positioned to move the compliant slider of the compliant slider assembly with respect to the leg, the motor assembly including a gear engaging the rack of the compliant slider assembly and a motor coupled to drive the gear, wherein the compliant slider of the compliant slider assembly is configured to vary the stiffness of the leg of the leg assembly as it is moved by the motor assembly with respect to the leg.

\* \* \* \* \*